US00RE41794E

(19) United States
(12) Reissued Patent
Huang et al.

(10) Patent Number: US RE41,794 E
(45) Date of Reissued Patent: Oct. 5, 2010

(54) OPTICAL LENS DEVICE OF IMAGE SCANNER

(76) Inventors: Shi-Hua Huang, 2F., No. 14, Lane 133, Zhongyang Rd., Xindlan City, Taipei County 231 (TW); Po-Hua Fang, 8F.-2, No. 290, Gongyuan Rd., Hsinchu City 300 (TW)

(21) Appl. No.: 11/499,821

(22) Filed: Aug. 3, 2006

Related U.S. Patent Documents

Reissue of:
(64) Patent No.: 6,771,408
Issued: Aug. 3, 2004
Appl. No.: 10/324,576
Filed: Dec. 19, 2002

(30) Foreign Application Priority Data

Apr. 12, 2002 (TW) ..... 91107397

(51) Int. Cl.
*G02B 26/08* (2006.01)

(52) U.S. Cl. ..... 359/205.1; 358/474; 358/483
(58) Field of Classification Search .... 359/196.1–226.2, 359/739–740; 358/474–497, 296, 302; 355/55–57
See application file for complete search history.

(56) References Cited

U.S. PATENT DOCUMENTS 6,147,811 A * 11/2000 Fujibayashi ..... 359/689
6,208,474 B1 3/2001 Kondo
6,469,820 B1 * 10/2002 Mushiake et al. ..... 359/215

FOREIGN PATENT DOCUMENTS

| | | |
|---|---|---|
| CN | 2354184 Y | 12/1999 |
| JP | H11-237547 | 8/1999 |
| JP | 2001-100095 | 4/2001 |
| JP | 2002-244033 | 8/2002 |

* cited by examiner

*Primary Examiner*—James Phan
(74) *Attorney, Agent, or Firm*—Stolowitz Ford Cowger LLP

(57) ABSTRACT

An optical lens device of image scanner includes a diaphragm and plural lenses. The plural lenses, diaphragm, and image induction element are linearly arranged for defining an optical path between the document and the image induction element. Wherein, among the plural lenses, the one that is most close to the manuscript is called the first lens, and the other one that is most close to the image induction element is called the last lens, and the distance between the last lens and the image induction element is called BFL, and the length of the image induction element is called image height, and the total optical length between the document and the image induction element is called TT, and the effective focus length of the optical lens device is called EFL. If the optical lens device fulfills following conditions: the diameter of the last lens/the diameter of the first lens>1; EFL/image height<0.9; and BFL/TT<0.05, then the values of TT and BFL may be reduced relatively, and the entire volume of the image scanner may also be shrunk relatively.

44 Claims, 11 Drawing Sheets

| Lens Statistical Data | | | | | | | | | | | | |
|---|---|---|---|---|---|---|---|---|---|---|---|---|
| Embo-diment | Lens Name | TT | Image Height (CCD dim-ension) | Lens Arran-gement | Front Group Focus | Back Group Focus | EFL | BFL | Image Height/ TT | EFL/ Image Height | BFL/ TT | Last/ First (Diameter Ratio) |
| 1 | a4, 4u, 600dpi, 4G | 183.7 | 20.4 | 12s34 | 2378.37 | 11.68 | 13.8 | 4.84 | 0.1111 | 0.676 | 0.026 | 2.01 |
| 2 | a4, 4u, 1200dpi, 5G | 250 | 40.8 | 12s345 | -74.94 | 19.12 | 32.18 | 23.36 | 0.1632 | 0.789 | 0.093 | 1.70 |
| 3 | a4, 5.25u, 300dpi, 3G | 183.8 | 13.3875 | 1s23 | -15.82 | 5.88 | 9.79 | 5.04 | 0.0728 | 0.731 | 0.027 | 2.48 |
| 4 | a4, 5.25u, 300dpi, 4G | 183.8 | 13.3875 | s1234 | 0.00 | 9.93 | 9.93 | 5.33 | 0.0728 | 0.742 | 0.029 | 4.47 |
| 5 | a3, 4u, 600dpi, 5G | 250 | 28.08 | 12s345 | 46.82 | 36.88 | 19.3 | 7 | 0.1123 | 0.687 | 0.028 | 5.89 |
| Prior Art 1 | a4, 4u, 600dpi, 4G | 250 | 20.4 | 12s3 | -18.77 | 8.35 | 19.7 | 18.7 | 0.0816 | 0.966 | 0.075 | 0.81 |
| Prior Art 2 | a4, 4u, 1200dpi | 353 | 40.8 | | | | | | | | | |
| Prior Art 3 | a4, 7u, 300dpi | 243 | 17.85 | | | | | | | | | |
| Prior Art 4 | a3, 7u, 800dpi | 525.3 | 65.52 | | | | | | | | | |

FIG. 9

OPTICAL LENS DEVICE OF IMAGE SCANNER

Matter enclosed in heavy brackets [ ] appears in the original patent but forms no part of this reissue specification; matter printed in italics indicates the additions made by reissue.

FIELD OF THE INVENTION

The invention relates to an optical lens device of image scanner, especially to an optical lens device that is adapted to an image scanner having relatively short total track (abbreviated as TT) and back focus length (abbreviated as BFL), such that the total volume of the image scanner may be shrunk relatively.

BACKGROUND OF THE INVENTION

The application fields of an optical lens set may generally be divided into several categories, one of which has endless image distance and limited (or short) object distance, such as: the lens sets of slide projector, overhead projector, or film projector, etc. Another kind of optical lens set has limited (or short) image distance and endless object distance, such as: the lens sets of camera, video camera, and telescope, etc. There are also two kinds of application mode for the lens set having limited image distance and object distance: one has longer image distance and relatively shorter object distance, for example, the lens set of microscope, and another one has longer object distance and relatively shorter image distance, and the image scanner of charge coupled device is then one application category of this kind of optical lens set. For said application categories of different kinds of optical lens set, there are different characteristics and limitations of design, assembly, and application for each mirror within the lens set. The main objective of the invention is to make an improvement for the optical lens set, of image scanner, having longer object distance but relatively shorter image distance.

Please refer to FIG. 1, which is an embodiment of a typical flatbed optical scanner 1 commonly seen in current market. Wherein, a document window glass 12 is arranged on the upper side surface of the casing 11 of a scanner 1 for supporting a document to be scanned (not shown in the figure) and, through a driving device 13, an optical chassis 14 is brought along to proceed a linear motion along the guiding rod 15 in the hollow casing 11, such that an image scanning job may be executed to the document placed on the glass 12.

Please refer to FIG. 2, which is the A—A cross-sectional view for the optical chassis 14 of the image scanner 1 shown in FIG. 1 according to the prior arts. The optical chassis 14 includes: a hollow casing 141, a light source 142 positioned at an appropriate position on the upper side surface of the casing 141, a light-guiding device comprised by plural reflective minors 143, a lens set 144, and a charge coupled device (abbreviated as CCD). From the light source 142, the light is incident onto the document (not shown in the figure) placed on the glass 12 and, after the reflected light of the image of the document enters the casing 141 of the optical chassis 14, it is reflected and direction-changed by plural reflective mirrors 143 of the light-guiding device for increasing the optical length to an appropriate length, and the image is then focused and formed on the charge coupled device 145, which converts the scanned image data into electric signals that are readable for the computer.

As shown in FIG. 1 and FIG. 2, the reflective mirror 143 of the optical chassis 14 of the prior arts is comprised of a glass piece formed as thin plate and coated with silver, and additional spring piece 146, fixing mechanism, or screw are needed to fix the reflective mirror 143 at a predetermined position on the inner side of the casing 141. Furthermore, since each reflective mirror 143 all has only one reflective plane to proceed light reflection only once so, in order to reach the total track (abbreviated as TT, that is, the total value of Y1+Y2+. . . +Y5, as shown in FIG. 2) needed by the lens set 144 to focus a clear image, the distance and the corresponding angle between each reflective mirror 143 are needed to be arranged appropriately.

As shown in FIG. 3, which is a plane developing illustration to show that an image of the document 16 of a typical image scanner 1 is reflected by the reflective mirror 143 and finally focused on the charge coupled device 145 by the lens set 144. In FIG. 3, when an image scanner 1 proceeds image scanning, the relative relationship of the distances between the document 16 and each optical element is as follows: TT (total track) is the distance between the document 16 and the charge coupled device 145, W is the width of the document 16, the length of the effective pixel range of the charge coupled device 145 is L, the effective focus length (abbreviated as EFL) of the lens set 144 is EFL, the distance between the last lens (the mirror that is most close to the charge coupled device) of the lens set and the charge coupled device 145 is BFL (Back Focus Length). Each value described above is mainly determined by the optical design parameters of the lens set 144.

For the all image scanner 1 known currently, the magnitudes of its TT value and BFL value are still the most important factors influencing the size of the optical chassis 14, while the size and the occupied space during scanning of the optical chassis 14 again occupy over 80% of the entire volume of a traditional flatbed image scanner 1. Since the current trend of the design concept of the electronic information products is still toward the directions of minimization, lightness, thinness, and convenience of being carried personally, so how to further reduce the size of the optical chassis 14 will be the essential key-point for further shrinking the entire volume of the image scanner 1. However, for the all products of the flatbed image scanner 1 seen in current market according to the prior arts, their TT value and BFL value are still relatively large. For example, for a traditional charge coupled device having 600 dpi resolution, 4 μm pixel pitch and capable of scanning the maximum document paper in A4 size, the current optical lens set according to prior arts may only reach the length value of TT value≧240 mm and BFL value≦18 mm. As for the charge coupled device having higher resolution of 1200 dpi, same pixel pitch of 4 μm and capable of scanning the maximum document paper in A4 size, its TT value is further greater than 350 mm. Furthermore, for the charge coupled device, of low level, having lower resolution of 300 dpi, 7 μm pixel pitch and adapted for scanning document in A4 size, its TT value is still necessarily greater than 240 mm. In fact, the TT values of the prior arts described thereinbefore still have large room for further improvement, otherwise they will cause the entire volume of the optical chassis and the image scanner still very large and uneasy to be shrunk, and this shortcoming should be solved as soon as possible.

The patents of the U.S. Pat. Nos. 6,208,474, 6,014,262, 6,208,474B1, 5,386,312, and 6,147,811 had disclosed the structural design and allocation of the mirrors inside the optical lens set of several kinds. However, the prior patents have never disclosed the same technical characteristics and achievable functions as those of the present invention.

SUMMARY OF THE INVENTION

The first objective of the invention is to provide an optical lens device of image scanner, and it has a relatively short total track (TT), such that the volume of the optical chassis and the image scanner may further be shrunk.

The second objective of the invention is to provide an optical lens device of image scanner, and the distance (BFL value) between the last lens of its lens set and the charge coupled device may further be shrunk.

To achieve above objectives, in a preferable embodiment of the optical lens device of image scanner according to the invention, the optical lens device may receive the optical image reflected from a document and focuses the optical image into an image on an image induction element, and the optical lens device at least includes: a diaphragm and plural lenses. The diaphragm, plural lenses, and image induction element are arranged linearly for defining an optical path between the document and the image induction element. Wherein, according to the different positions between the lens and the diaphragm, the plural lenses may be divided into two groups; i.e., the front group lens is located between the diaphragm and the document, and the back group lens is located between the diaphragm and the image induction element. Wherein, among the plural lenses, the one that is most close to the document is called the first lens, while the other one that is most close to the image induction element is called the last lens, and the distance that is between the last lens and the image induction element is abbreviated as BFL, and the length, of the induced image, provided by the image induction element is called the image height, and the distance between the document and the image induction element is abbreviated as TT, and the effective focus length of the optical lens device is abbreviated as EFL. It is characterized that the optical lens device at least fulfills the following conditions: the diameter of the last lens/the diameter of the first lens>1; EFL/image height<0.9; and BFL/TT<0.05.

Preferably, when the image induction element is the charge coupled device (abbreviated as CCD) having 4 μm pixel pitch, 600 dpi resolution and capable of scanning the maximum document in A4 size, the TT value is smaller than 200 mm.

Preferably, when the image induction element is the charge coupled device (abbreviated as CCD) having 5.25 μm pixel pitch, 300 dpi resolution and capable of scanning the maximum document in A4 size, the TT value is smaller than 200 mm.

Preferably, when the image induction element is the charge coupled device (abbreviated as CCD) having 4 μm pixel pitch, 600 dpi resolution and capable of scanning the maximum document in A3 size, the TT value is smaller than 280 mm.

Preferably, when the image induction element is the charge coupled device (abbreviated as CCD) having 4 μm pixel pitch, 1200 dpi resolution and capable of scanning the maximum document in A4 size, the TT value is smaller than 280 mm, and BFL<25 mm, BFL/TT<0.1.

For further deeply describing the invention, a detail description together with corresponding drawings is present as follows. Hope those will facilitate your esteemed members of reviewing committee in reviewing this invention.

BRIEF DESCRIPTION OF THE DRAWINGS

FIG. 9 is a design parameter table for the optical lens devices of five preferable embodiments (i.e., the preferable embodiments from FIG. 4 to FIG. 8) according to the invention and four embodiments according to the prior arts.

DETAILED DESCRIPTION OF THE INVENTION

The optical lens device of the image scanner according to the invention is mainly a design improvement for the optical lens device in the optical chassis of an image scanner such that, after the plural lenses in the optical lens device are appropriately designed and matched with the diaphragm, following optical characteristics may be obtained: the diameter of the last lens/the diameter of the first lens>1, and the effective focus length/image height<0.9. By this kind of design, the optical lens device of the image scanner according to the invention will have relatively shorter total track (TT) and relative shorter BFL that is the distance between the last lens and the charge coupled device, such that the volume of the optical chassis and the image scanner may further be shrunk.

Detailed structure, motion manner, function, and other characteristic of the optical lens device of the image scanner according to the invention will be described in detail from the following several preferable embodiments.

Figure 1:
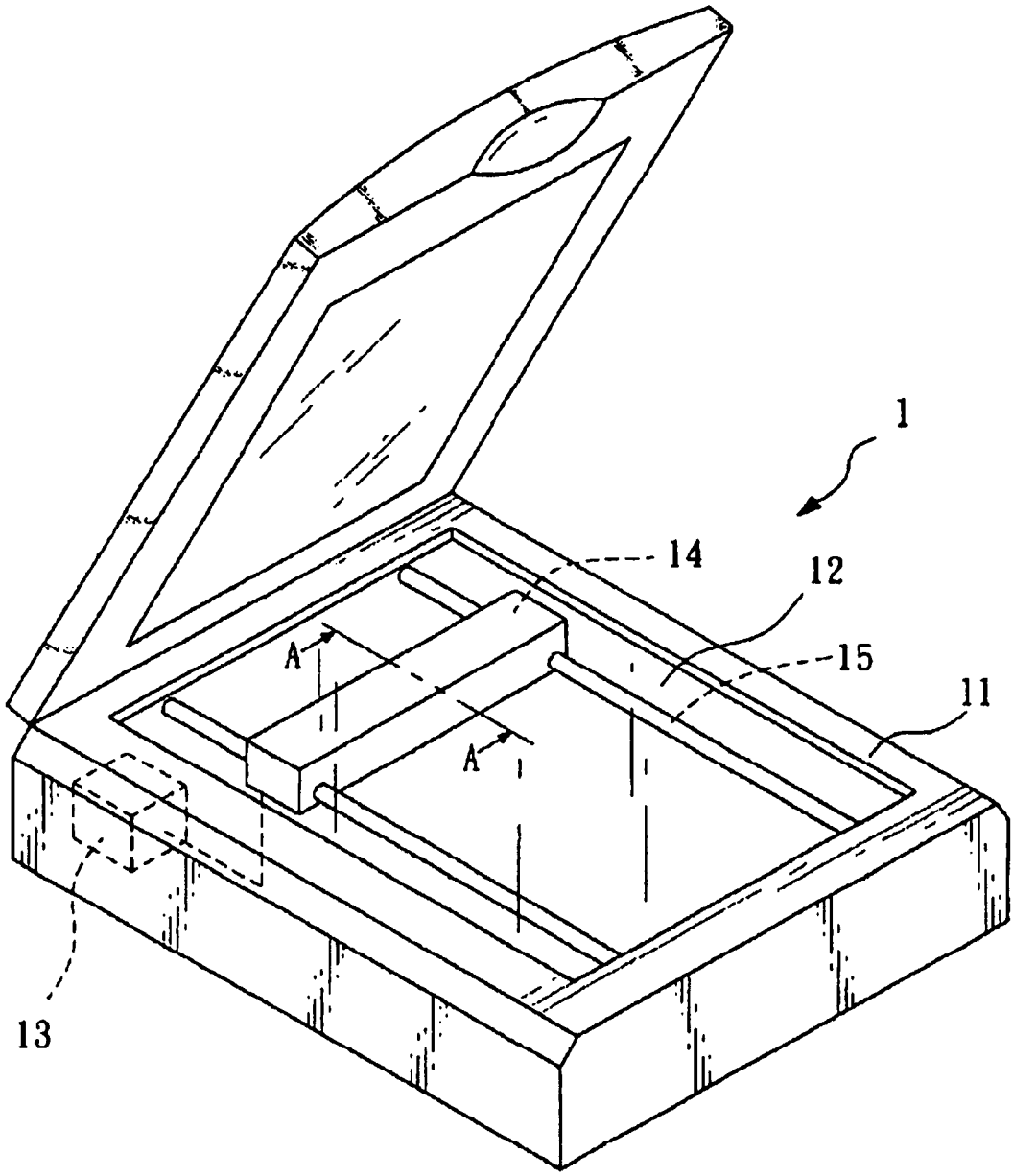
FIG. 1 (PRIOR ART)
FIG. 1 is an illustration of the image scanner according to the prior arts.
Figure 2:
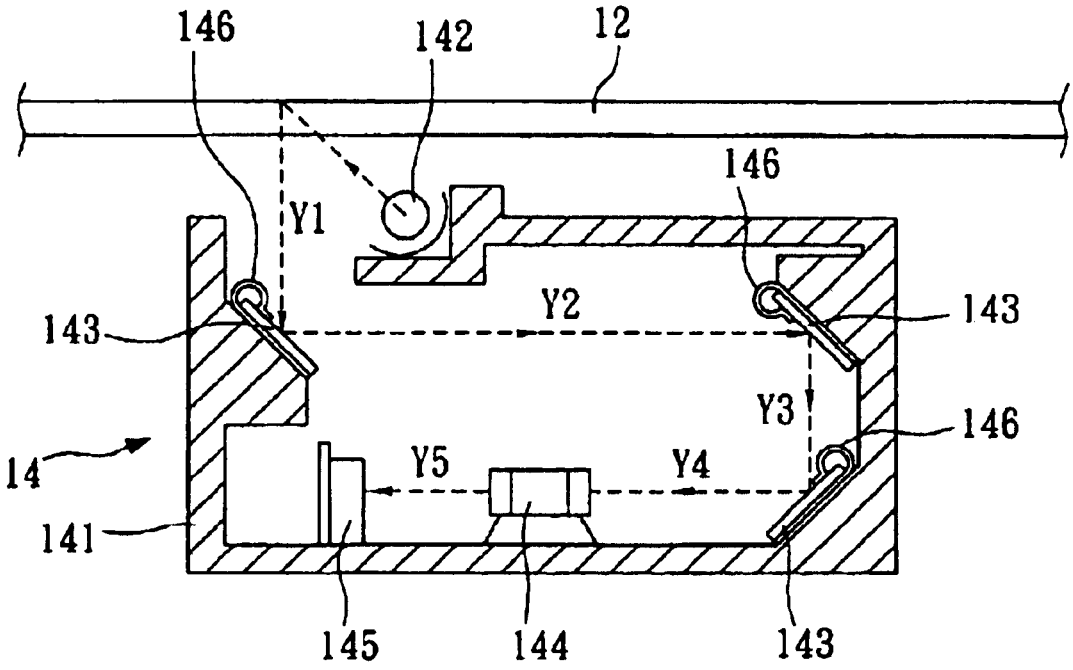
FIG. 2 (PRIOR ART)
FIG. 2 is an illustration of the optical chassis of the image scanner according to the prior arts.
Figure 3:
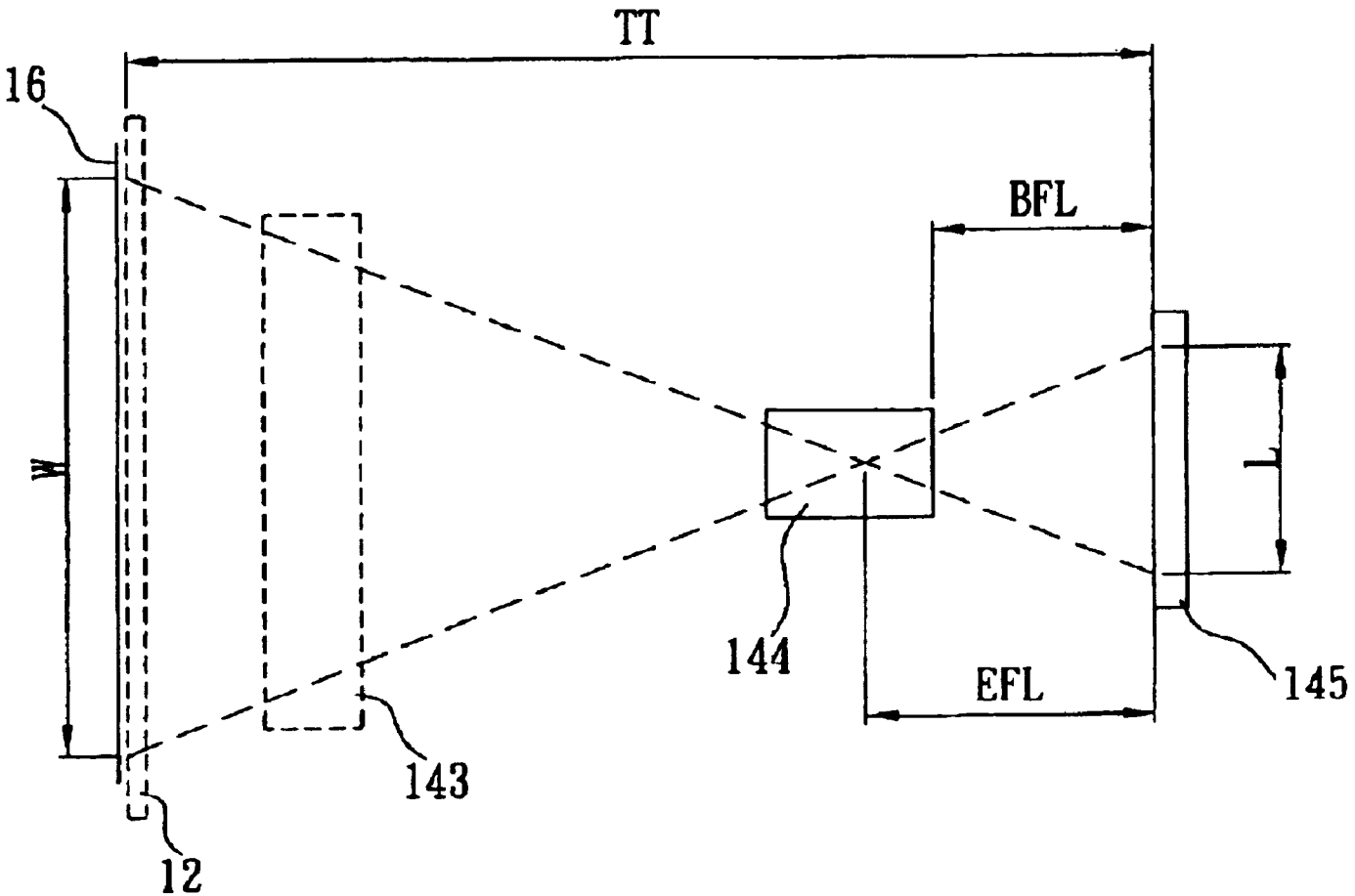
FIG. 3 is a plane developing illustration to show that an image of the document of a typical image scanner is reflected by the reflective mirror and finally focused on the charge coupled device by the lens set.
Figure 4:
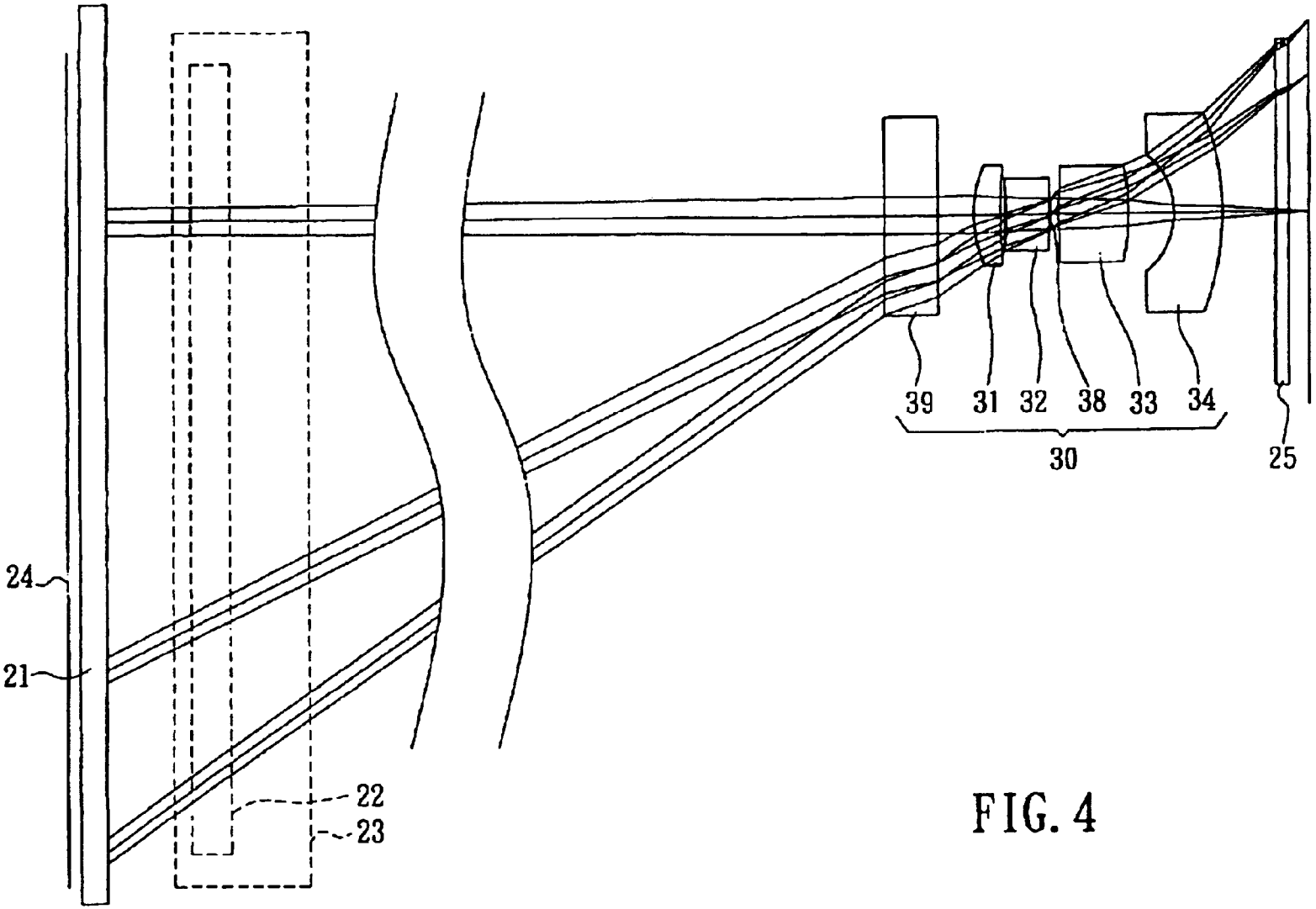
FIG. 4 is an illustration of the first preferable embodiment of the optical lens device of the image scanner according to the invention.

Please refer to FIG. 4, which is the first preferable embodiment of the optical lens set 30 of the image scanner according to the invention. Except the optical lens device 30, the other elements of the image scanner are basically and approximately similar to those of the prior arts, such as: a scanning area 21, a light source 22, a light-guiding device 23, and an image induction element 25.

The scanning area 21 is usually comprised of transparent glass or acrylic materials for supporting a document 24 to be scanned. The light source 22 may emit light toward the scanning area 21 for generating an optical image for the document 24. In this preferable embodiment, the light source 22 is a long, narrow, tube-shaped lamp arranged at the light-guiding device 23 and may emit light toward the document 24 for generating a reflective optical image of the document 24. In another preferable embodiment, the light source 22 may also be able to be arranged at another side of the document 24 (i.e., one side, of the document 24, that is farther from the light-guiding device 23) and emits light for penetrating through the document 24 to generate the optical image of the document 24. And, the light source of this embodiment may also be a long, narrow, tube-shaped lamp that may provide light-backing plate module of plane light source or linear light source.

The light-guiding device is comprised of a reflective mirror (not shown in the figure), which may proceed at least once reflection to the optical image coming from the document 24 for increasing the optical length, and which then guides and projects the optical light toward a predetermined direction. The optical lens device 30 of the invention then receives the optical image transferred from the light-guiding device 23 and focuses it into an image formed on the image induction element 25. The image induction element 25 may convert the inductively received optical image signals, into the electronic signals readable and manageable by a computer (not shown in the figure). In this preferable embodiment, the image induction device 25 may be a charge coupled device (abbreviated as CCD), which is just located at the corresponding position that may focus the optical image and form a clear image. In the said scanning area 21, light source 22, light-guiding device 23, document 24, and image induction element 25, except the light-guiding device 23 having further less number of reflective mirror and smaller volume size than those of the prior arts because of the unique design of the optical lens device 30 of the invention, other comprising elements are roughly similar to those of the prior arts and are not the major technical characteristics of the invention, so they will not be described repetitiously thereinafter.

According to the invention, the optical lens device 30 at least includes: a diaphragm 38 and plural lenses 31, 32, 33, 34. The plural lenses 31, 32, 33, 34 are arranged linearly with the diaphragm 38 and the image induction element 25 for defining an optical path between the document 24 and the image induction element 25. Wherein, among the plural lenses 31, 32, 33, 34, one of which that is most close to the document 24 is called the first lens 31, and one of which that is most close to the image induction element 25 is called the last lens 34, while the distance between the last lens 34 and the image induction element 25 is called BFL, and the length, of the image induction device, available for inducing image is called the image height, and the distance between the document 24 and the image induction element 25 is abbreviated as TT (total track), and the effective focus length of the optical lens device 30 is abbreviated as EFL. Furthermore, according to the different positions between the diaphragm 38 and the lens, the plural lenses 31, 32, 33, 34 may be divided into two groups; i.e., the front group lenses 31, 32 that are located between the diaphragm 38 and the document 24, and the back group lenses 33, 34 that are located between the diaphragm 38 and the image induction element 25.

In the first preferable embodiment, the number of the lens of the optical lens device 30 is four, and they are the first lens 31, the second lens 32, the third lens 33, and the last lens 34 respectively. Between the second and the third lens 32, 33, the diaphragm 38 is arranged for dividing the plural lenses into the front group lenses (i.e., the first and the second lenses 31, 32) and the back group lenses (i.e., the third and the last lens 33, 34) and, at the appropriate position before the first lens 31 (i.e., the side that is closer to the document 24), a plane mirror 39 of zero curvature is arranged additionally. According to the curvature, the lenses are sequentially divided as (start from the first lens 31): convex-concave lens (the first lens 31), concave-concave lens (the second lens 32), convex-convex lens (the third lens 33), and concave-convex lens (the last lens 34).

In this first preferable embodiment, the optical lens device 30 preferably fulfills following conditions of optical design, such as:

(1) The maximum size of scanned document 24 is A4 size (210 mm*297 mm).

(2) The image induction element 25 is a charge coupled device (abbreviated as CCD) having 4 μm pixel pitch and 600 dpi resolution, and the effective induction length (i.e., the image height) of the image induction element 25 is 20.4 mm.

(3) The value for the diameter of the last lens 34 being divided by the diameter of the first lens 31 is 2.01; that is, the diameter of the last lens/the diameter of the first lens=2.01; at this time, the diameter of the last lens/the diameter of the fist lens>1.

(4) The front group focus (i.e., the focus of the front group lens) and the back group focus of the optical lens device 30 respectively are 2378.37 mm and 11.68 mm, and the effective focus length (EFL) of the optical lens device 30 is 13.8 mm, and the distance (BFL) between the last lens 34 and the image induction element 25 is 4.84 mm.

Under the design conditions described thereinbefore, we can obtain the first preferable embodiment of the invention shown in FIG. 4 as follows: TT value is smaller than 200 mm to reach the relatively shorter distance of 183.77 mm, the value of the image height divided by the TT (i.e., image height/TT) is 0.1111, the value of EFL divided by the image height (i.e., EFL/image height) is 0.676, and the value of BFL divided by the TT (i.e., BFL/TT) is 0.026. That is, TT value is smaller than 200 mm; BFL<10 mm; EFL/image height<0.9; BFT/TT<0.05.

Comparing to the charge coupled device according to the current traditional prior arts, mentioned in the "Invention Background" section of this patent application, having 600 psi resolution and 4 μm pixel pitch, and capable of scanning the maximum document in A4 size, the TT value of the prior optical lens set is at least greater than 240 mm and the length value of the BFL is at least greater than 18 mm. It is known that, through the improving design of the optical lens device 30 of the invention, it may greatly shrink the TT value over 20% and further shrink the BFL value over 70% under the same design conditions (i.e., the document of A4 size, the CCD having 600 dpi resolution and 4 μm pixel pitch). It thus proves that, compared to prior arts, the unique design for the optical lens device 30 of the invention may effectively shrink both values of TT and BFL, such that the number of the reflective mirror of the optical chassis (i.e., the light-guiding device 23) is lessened or the volume size of the optical chassis (i.e., the light-guiding device 23) is shrunk so, not only may the space allocation and the design difficulty of the light-guiding device 23 be lowered down but also, if the number of the reflective mirror is lessened, then the manufacturing cost may also be lowered down, and the entire volume of the optical image scanner will be further shrunk, such that the costs of the storage and transportation for the products will be lowered down, and the product value and the market's competence will be further enhanced relatively because of the minimization of the product.

In following other preferable embodiments, since the elements of most part are same as or similar to those of the said embodiment, so the same or similar element will be designated with same referential name and number, and its composition will not be described repetitiously herein.

Figure 5:
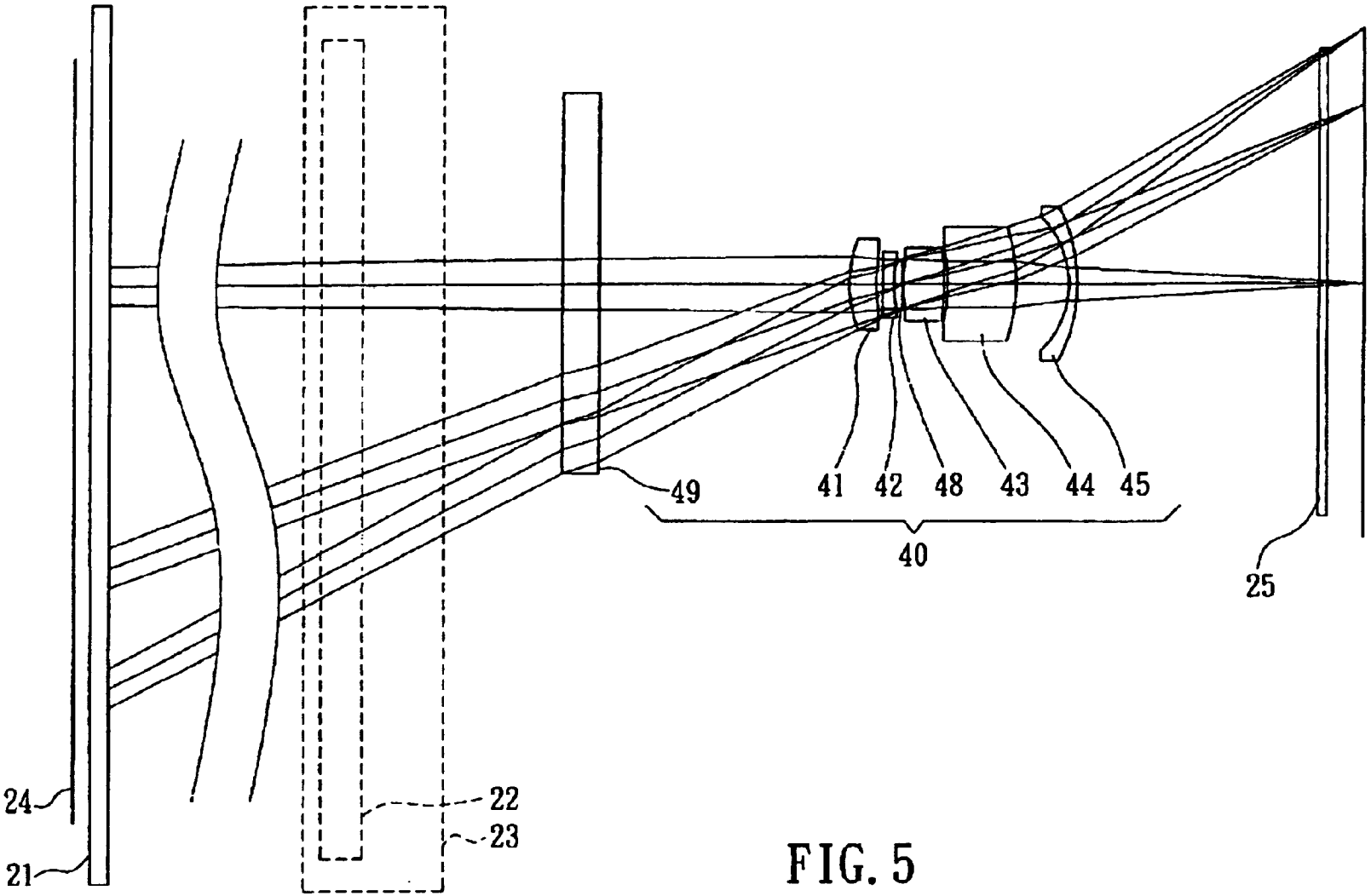
FIG. 5 is an illustration of the second preferable embodiment of the optical lens device of the image scanner according to the invention.

Please refer to FIG. 5, which is the second preferable embodiment of the optical lens device 40 of the image scanner according to the invention. Except the optical lens device 40, other elements of the image scanner are basically and approximately similar to those of the said embodiment, such as: a scanning area 21, a light source 22, a light-guiding device 23, and an image induction element 25.

In this second preferable embodiment, the optical lens device 40 includes: a diaphragm 48 and plural lenses 41, 42, 43, 44, 45, and the number of the plural lenses is five, and they are the first lens 41, the second lens 42, the third lens 43, the fourth lens 44, and the last lens 45 respectively. Between the second and the third lens 42, 43, the diaphragm 48 is arranged for dividing the plural lenses 41, 42, 43, 44, 45 into the front group lenses (i.e., the first and the second lenses 41, 42) and the back group lenses (i.e., the third, the fourth, and the last lens 43, 44, 45) and, at the appropriate position before the first lens 41 (i.e., the side that is closer to the document 24), a plane mirror 49 of zero curvature is arranged additionally. According to the curvature, the lenses 41, 42, 43, 44, 45 are sequentially divided as (start from the first lens 41): convex-concave lens (the first lens 41), concave-concave lens (the second lens 42), convex-convex lens (the third lens 43), concave-convex lens (the fourth lens 44), and concave-convex lens (the last lens 45).

In this second preferable embodiment, the optical lens device 40 preferably fulfills the following conditions of optical design, such as:

(1) The maximum size of scanned document 24 is A4 size.

(2) The image induction element 25 is a charge coupled device (abbreviated as CCD) having 4 μm pixel pitch and 1200 dpi resolution, and the effective induction length (i.e., the image height) of the image induction element 25 is 40.8 mm.

(3) The diameter of the last lens/the diameter of the first lens=1.7; that is, the diameter of the last lens/the diameter of the fist lens>1.

(4) The front group focus and the back group focus respectively are −74.94 mm and 19.12 mm, and the effective focus length (EFL) is 32.18 mm, and the distance (BFL) between the last lens 45 and the image induction element 25 is 23.36 mm.

Under the design conditions described thereinbefore, we can obtain the second preferable embodiment of the invention shown in FIG. 5 as follows: the TT value is 250 mm, the value of "image height/TT" is 0.1632, the value of "EFL/image height" is 0.789, and the value of "BFL/TT" is 0.093. That is, the TT value is smaller than 280 mm, BFL<25 mm, EFL/image height<0.9, and BFL/TT<0.1.

Comparing to the charge coupled device having 1200 psi resolution, 4 μm pixel pitch, and capable of scanning the maximum document in A4 size, the TT value of the image scanner according to the prior arts will be greater than 350 mm. It is known that, through the improving design of the optical lens device 40 of the invention, it may obtain clear image signal of the document 24 with the TT value of just 250 mm under the same design conditions (i.e., the document of A4 size, the CCD having 1200 dpi resolution and 4 μm pixel pitch). The invention has indeed greatly shrunk the TT value over 20%.

Figure 6:
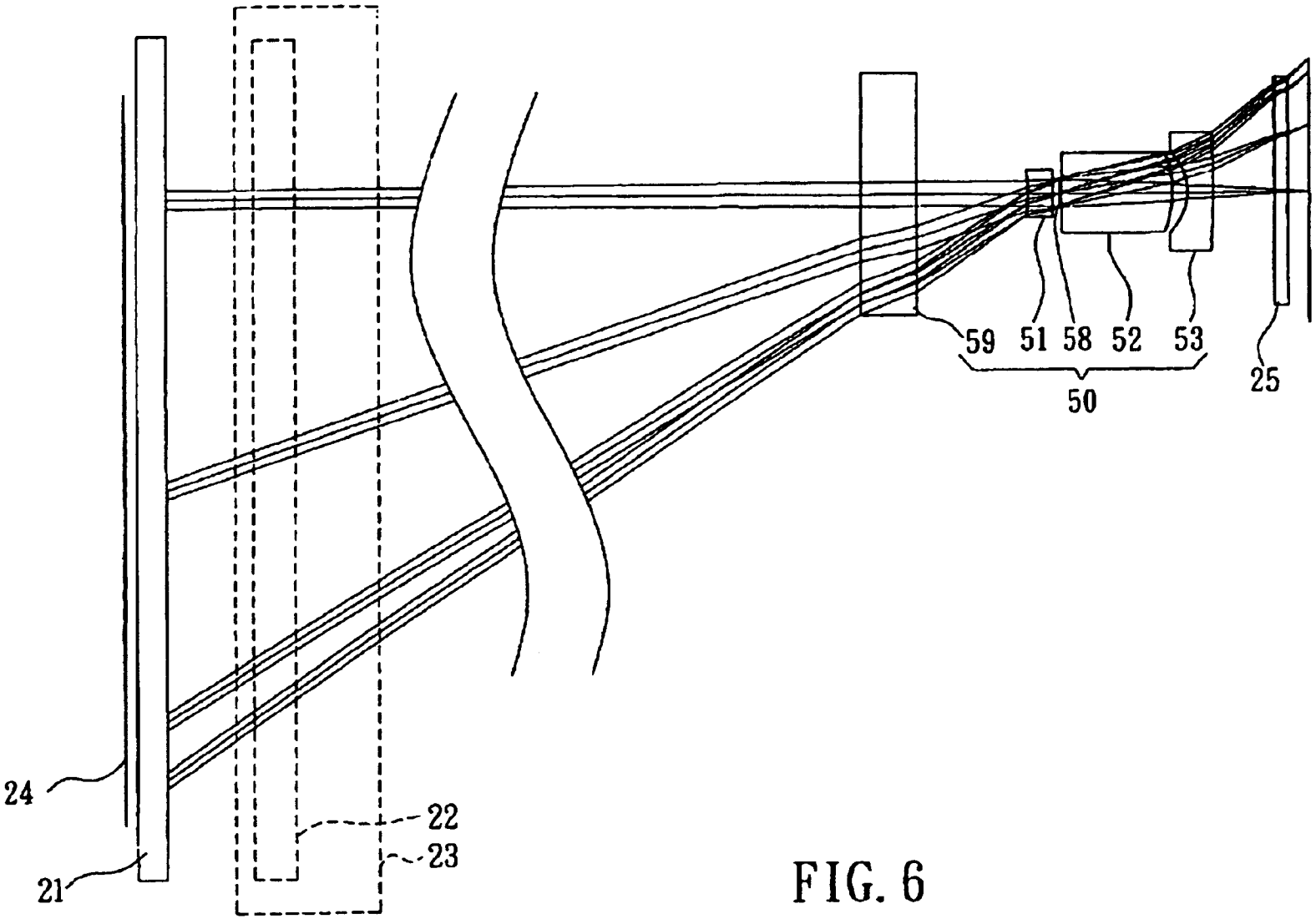
FIG. 6 is an illustration of the third preferable embodiment of the optical lens device of the image scanner according to the invention.

Please refer to FIG. 6, which is the third preferable embodiment of the optical lens device 50 of the image scanner according to the invention. The image scanner is also similarly comprised of a scanning area 21, a light source 22, a light-guiding device 23, and an image induction element 25.

In this third preferable embodiment, the optical lens device 50 includes: a diaphragm 58 and plural lenses 51, 52, 53, and the number of the plural lenses is three, and they are the first lens 51, the second lens 52, and the last lens 53 respectively. Between the first and the second lens 51, 52, the diaphragm 58 is arranged for dividing the plural lenses 51, 52, 53, into the front group lens (i.e., the first lens 51) and the back group lenses (i.e., the second and the last lens 52, 53) and, before the first lens 51, a plane mirror 59 of zero curvature is arranged additionally. According to the curvature, the lenses 51, 52, 53 are sequentially divided as: concave-convex lens (the first lens 51), convex-convex lens (the second lens 52), and concave-convex lens (the last lens 53).

In this third preferable embodiment, the optical lens device 50 preferably fulfills the following conditions of optical design, such as:

(1) The maximum size of scanned document 24 is A4 size.

(2) The image induction element 25 is a charge coupled device (abbreviated as CCD) having 5.25 μm pixel pitch and 300 dpi resolution, and the effective induction length (i.e., the image height) of the image induction element 25 is 13.3875 mm.

(3) The diameter of the last lens/the diameter of the first lens=2.48.

(4) The front group focus and the back group focus respectively are −15.82 mm and 5.88 mm, and the effective focus length (EFL) is 9.79 mm, and the distance (BFL) between the last lens and the image induction element is 5.04 mm.

Under the design conditions described thereinbefore, we can obtain the third preferable embodiment of the invention shown in FIG. 6 as follows: the TT value is 183.8 mm, the value of "image height/TT" is 0.0728, the value of "EFL/image height" is 0.731, and the value of "BFL/TT" is 0.027. That is, the TT value is smaller than 200 mm.

Comparing to the charge coupled device having lower resolution of 300 psi, 7 μm pixel pitch and capable of scanning the maximum document in A4 size, the TT value of the image scanner according to the prior arts will be greater than 240 mm. It is known that, through the improving design of the optical lens device 50 of the invention, it may obtain clear image signal of the document 24 with the TT value of just 183.8 mm under the similar design conditions (i.e., the document of A4 size and the CCD having 300 dpi resolution). The invention has indeed greatly shrunk the TT value over 20%.

Figure 7:
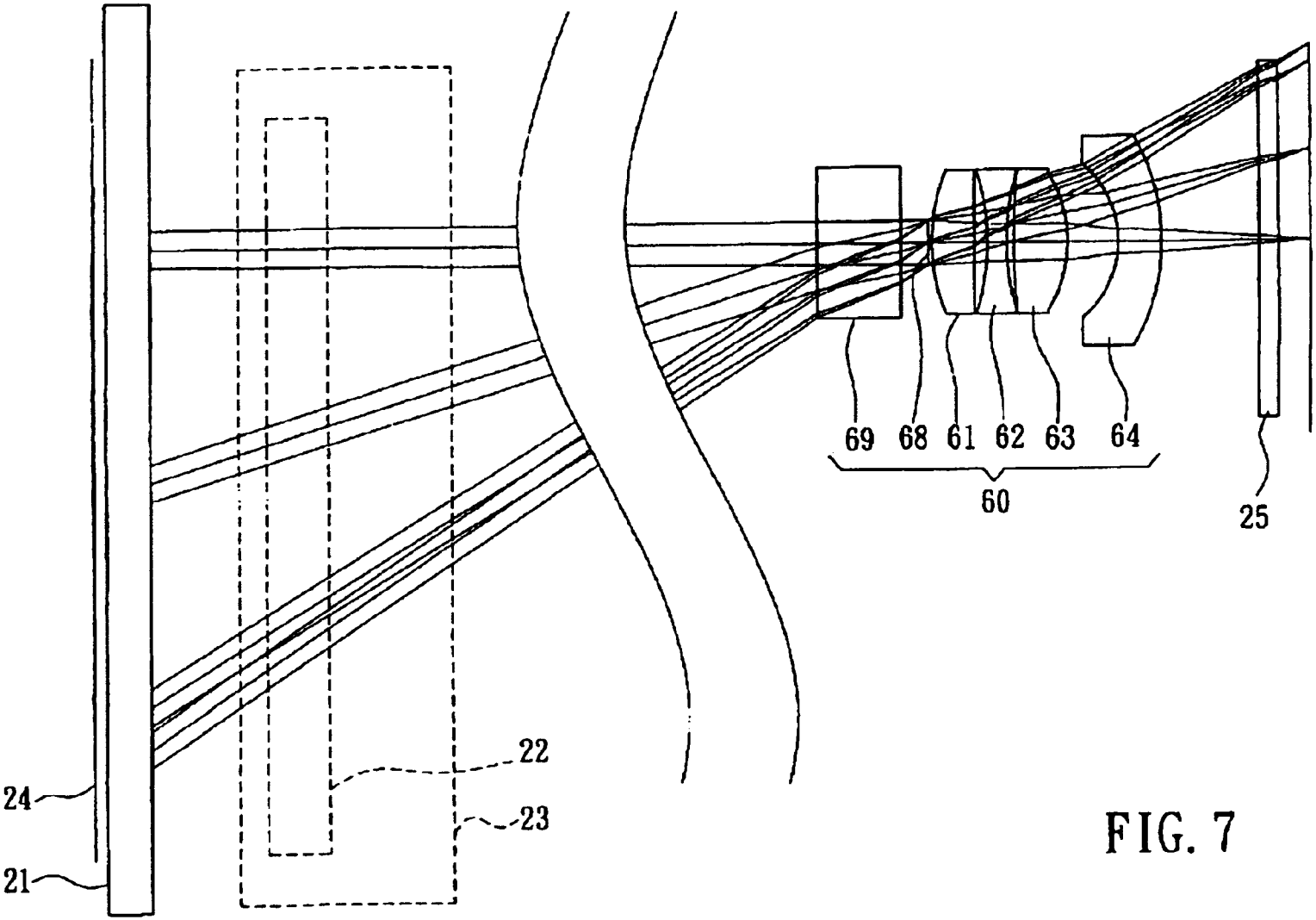
FIG. 7 is an illustration of the fourth preferable embodiment of the optical lens device of the image scanner according to the invention.

Please refer to FIG. 7, which is the fourth preferable embodiment of the optical lens device 60 of the image scanner according to the invention. The image scanner is also comprised of a scanning area 21, a light source 22, a light-guiding device 23, and an image induction element 25.

In this fourth preferable embodiment, the optical lens device 60 at least includes: a diaphragm 68 and plural lenses 61, 62, 63, 64, and the number of the plural lenses is four, and they are the first lens 61, the second lens 62, the third lens 63, and the last lens 64 respectively. Before the first lens 61 (the side that is closer to the document 24), the diaphragm 58 is arranged, so only the back group lenses are exited (i.e., the first lens to the last lens 61, 62, 63, 64) and, before the diaphragm 68, a plane mirror 69 of zero curvature is arranged additionally. According to the curvature, the lenses 61, 62, 63, 64 (start from the first lens 61) are sequentially divided as: convex-convex lens (the first lens 61), concave-concave lens (the second lens 62), convex-convex lens (the third lens 63), and concave-convex lens (the last lens 64).

In this fourth preferable embodiment, the optical lens device 60 preferably fulfills the following conditions of optical design, such as:

(1) The maximum size of scanned document 24 is A4 size.

(2) The image induction element 25 is a charge coupled device (abbreviated as CCD) having 5.25 μm pixel pitch and 300 dpi resolution, and the effective induction length (i.e., the image height) of the image induction element 25 is 13.3875 mm.

(3) The diameter of the last lens/the diameter of the first lens=4.47.

(4) The front group focus and the back group focus respectively are 0 mm and 9.93 mm, and the effective focus length (EFL) is 9.93 mm, and the distance (BFL) between the last lens and the image induction element is 5.33 mm.

Under the design conditions described thereinbefore, we can obtain the fourth preferable embodiment of the invention shown in FIG. 7 as follows: the TT value is 183.8 mm, the value of "image height/TT" is 0.0728, the value of "EFL/image height" is 0.742, and the value of "BFL/TT" is 0.029.

Comparing to the charge coupled device having lower resolution of 300 psi, 7 μm pixel pitch and capable of scanning the maximum document in A4 size, the TT value of the image scanner according to the prior arts will be greater than 240 mm. It is known that, through the improving design of the optical lens device 50 of the invention, it may obtain clear image signal of the document 24 with the TT value of just 183.8 mm under the similar design conditions (i.e., the document of A4 size and the CCD having 300 dpi resolution). The invention has indeed greatly shrunk the TT value over 20%.

Figure 8:
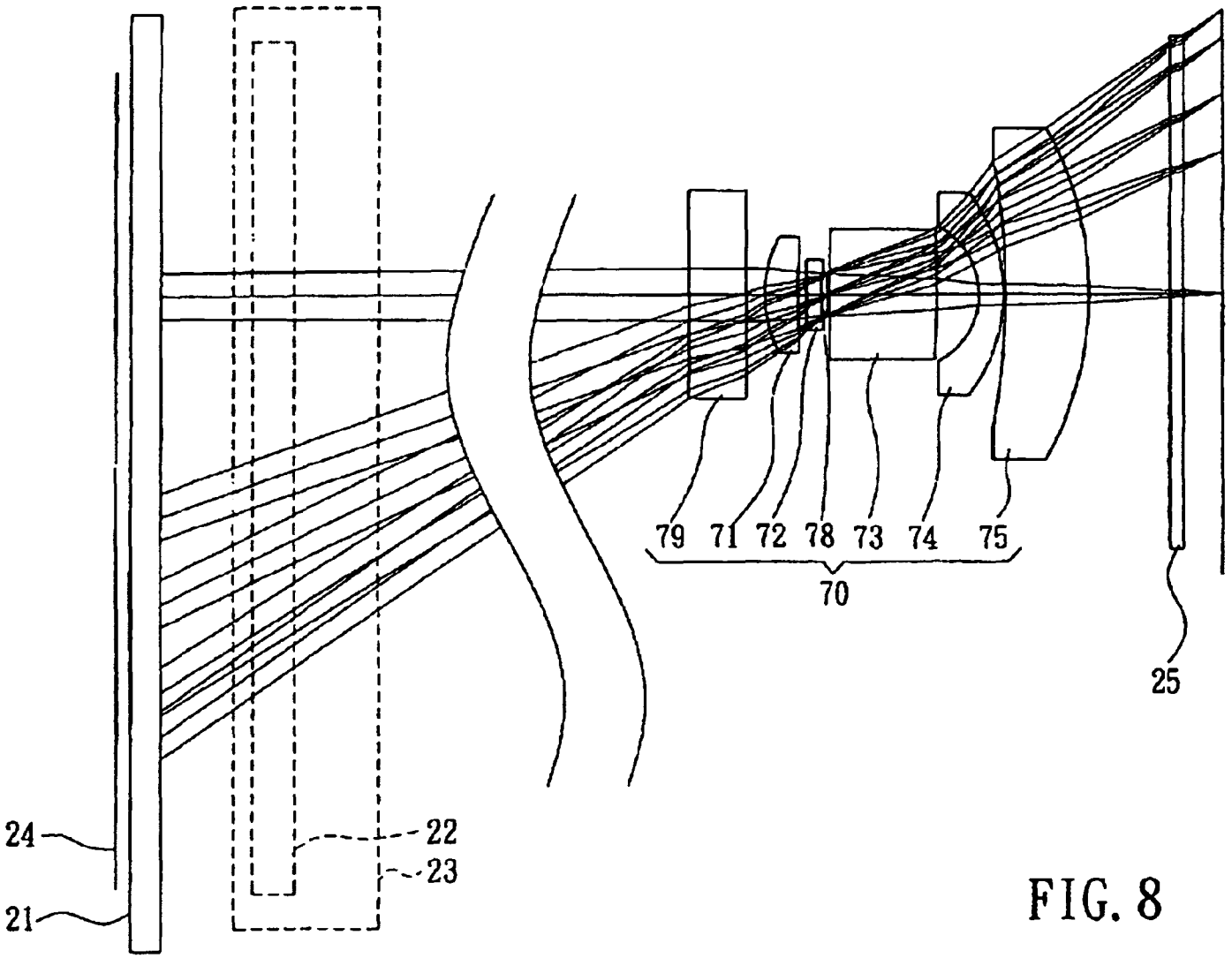
FIG. 8 is an illustration of the fifth preferable embodiment of the optical lens device of the image scanner according to the invention.

Please refer to FIG. 8, which is the fifth preferable embodiment of the optical lens device 70 of the image scanner according to the invention. The image scanner is also comprised of a scanning area 21, a light source 22, a light-guiding device 23, and an image induction element 25.

In this fifth preferable embodiment, the optical lens device 70 at least includes: a diaphragm 78 and plural lenses 71, 72, 73, 74, 75, and the number of the plural lenses is five, and they are the first lens 71, the second lens 72, the third lens 73, the fourth lens 74, and the last lens 75 respectively. Between the second and the third lens 72, 73, the diaphragm 78 is arranged for dividing the plural lenses 71, 72, 73, 74, 75 into the front group lenses (i.e., the first and the second lenses 71, 72) and the back group lenses (i.e., the third, the fourth, and the last lens 73, 74, 75) and, at the appropriate position before the first lens 71 (i.e., the side that is closer to the document 24), a plane mirror 79 of zero curvature is arranged additionally. According to the curvature, the lenses 71, 72, 73, 74, 75 are sequentially divided as (start from the first lens 71): convex-concave lens (the first lens 71), concave-concave lens (the second lens 72), convex-convex lens (the third lens 73), concave-convex lens (the fourth lens 74), and concave-convex lens (the last lens 75).

In this fifth preferable embodiment, the optical lens device 70 preferably fulfills the following conditions of optical design, such as:

(1) The maximum size of scanned document 24 is A3 size.

(2) The image induction element 25 is a charge coupled device (abbreviated as CCD) having 4 μm pixel pitch and 600 dpi resolution, and the effective induction length (i.e., the image height) of the image induction element 25 is 28.08 mm.

(3) The diameter of the last lens/the diameter of the first lens=5.89.

(4) The front group focus and the back group focus respectively are 46.82 mm and 36.88 mm, and the effective focus length (EFL) is 19.3 mm, and the distance (BFL) between the last lens 75 and the image induction element 25 is 7 mm.

Under the design conditions described thereinbefore, we can obtain the fifth preferable embodiment of the invention shown in FIG. 8 as follows: the TT value is 250 mm, the value of "image height/TT" is 0.1123, the value of "EFL/image height" is 0.687, and the value of "BFL/TT" is 0.028. That is, the TT value is smaller than 280 mm.

Please refer to FIG. 9, in which the parameters of each said preferable embodiment correspondingly with the parameters of the preferable embodiments according to the prior arts are arranged and listed, such that your esteemed members of reviewing committee may clearly understand the differences of the design conditions and the achievable functions between the optical lens device of the invention and that of prior arts. As shown in FIG. 9, which lists the design parameter values of the optical lens devices that are separately belonged to four embodiments of the prior arts (i.e., the prior art 1 to the prior art 4) and five said preferable embodiments of the invention (i.e., the first to the fifth preferable embodiments shown in FIG. 4 to FIG. 8). Wherein, several points are necessarily described first. In the table shown in FIG. 9, the meaning of each column under the title of "Lens Name" is: a4 represents that the maximum size of the scanned document is A4 size, 4 u represents that the pixel pitch of CCD is 4 μm, 600 dpi represents the resolution of CCD, 4G represents that the number of the lens is four, and et cetera. Furthermore, the s in "Lens Arrangement" column represents the position of the diaphragm located between two pieces of lens. Except the value of ratio, the unit for each length (or distance) column is mm (minimeter).

From the data listed in the table of FIG. 9, it is known that, if the CCDs with similar design condition such as same size of document and same resolution are compared with each other, then the embodiments of the invention have the advantage of great reduction in TT value by comparing with that of the prior arts. Not only may the number of the reflective mirror of the invention be lessened and may the volume size of the light-guiding device be shrunk, but also may the entire volume of the optical image scanner be further shrunk.

Figure 10A:
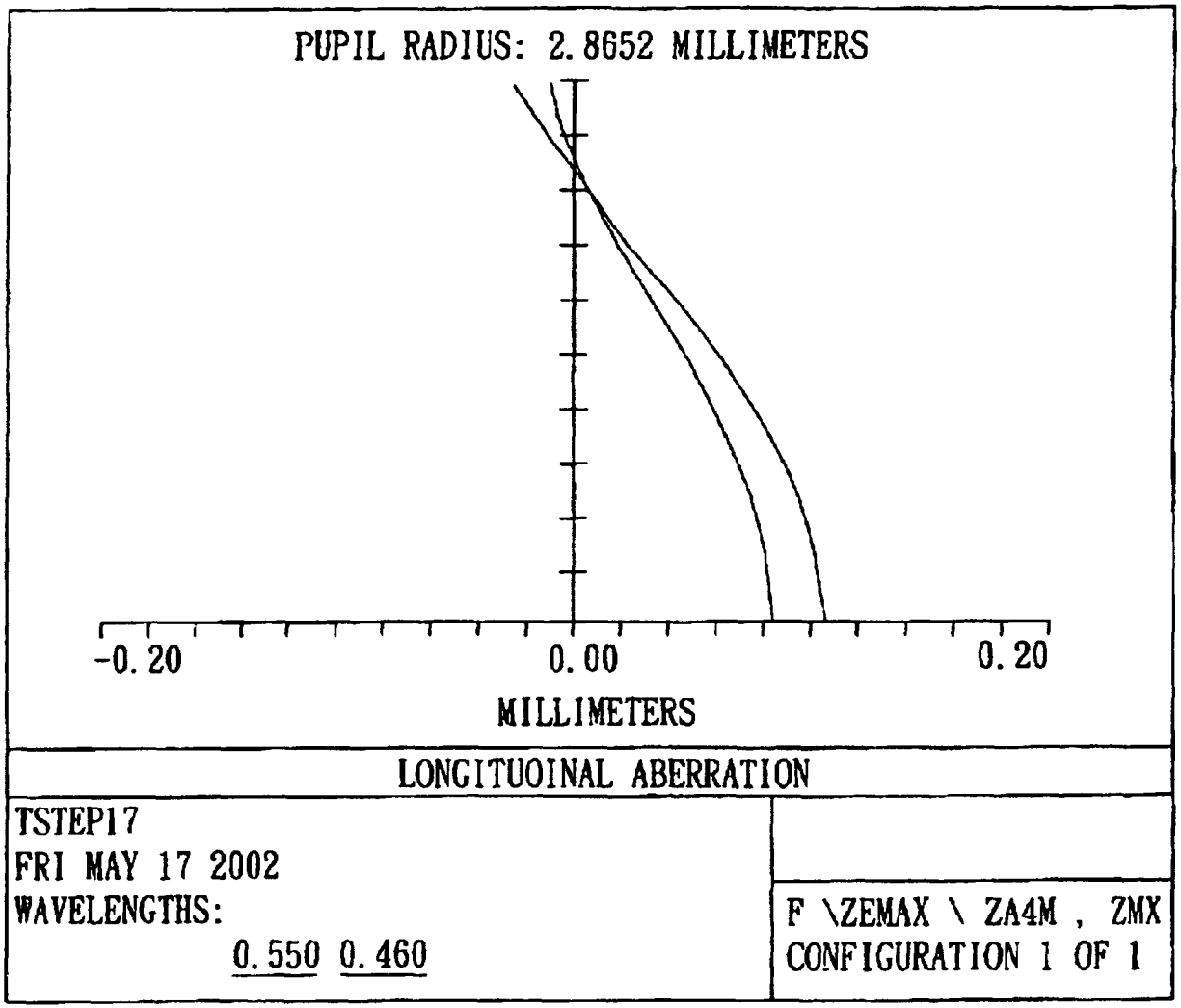
FIG. 10A is a characteristic curve diagram for the longitudinal aberration of the optical lens device shown in FIG. 5.
Figure 10B:
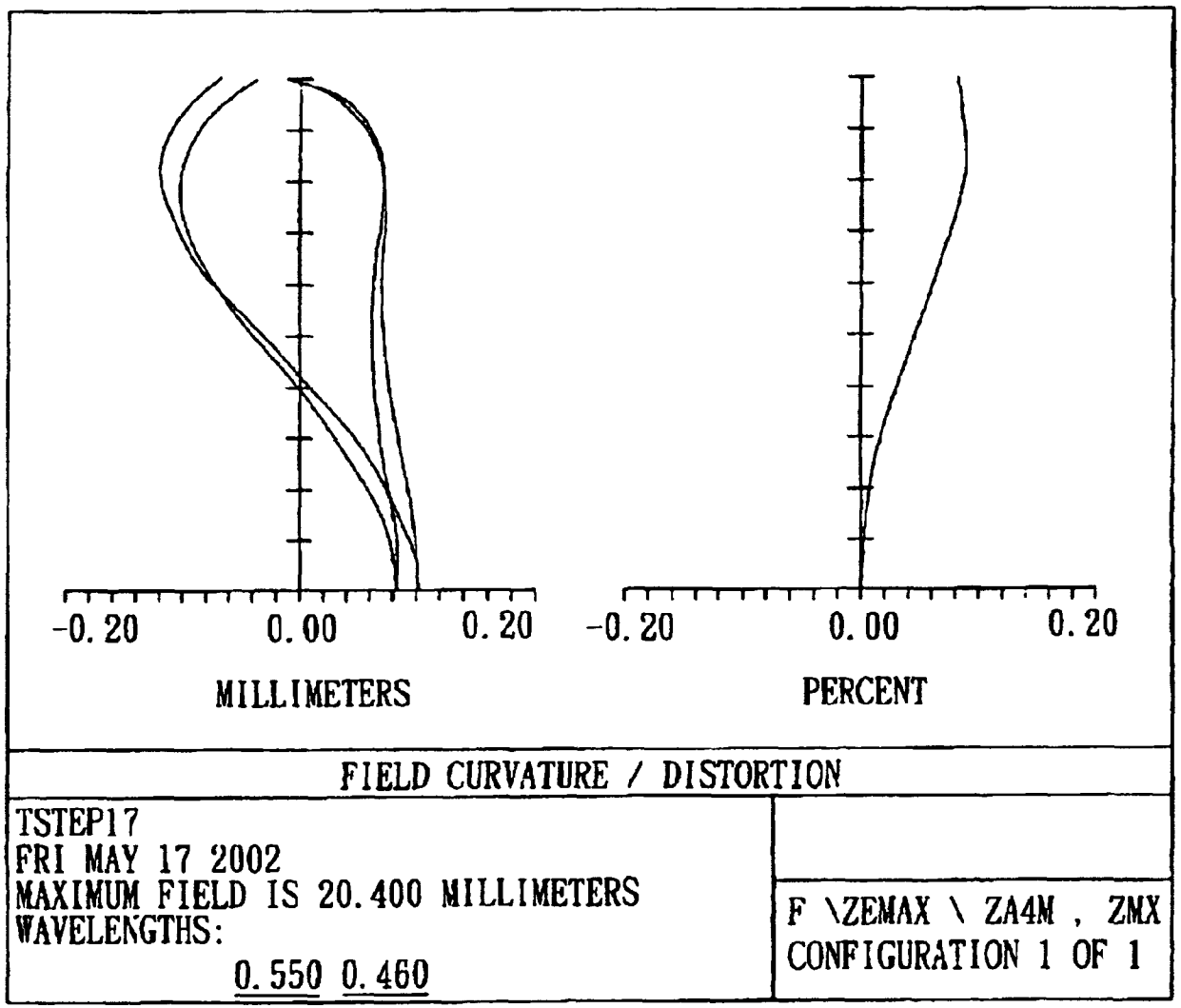
FIG. 10B is a characteristic curve diagram for the field curvature/distortion of the optical lens shown in FIG. 5.

Please refer to FIG. 10A and FIG. 10B, which are respectively the characteristic curve diagrams for the longitudinal aberration and field curvature/distortion verified for the second preferable embodiment of the optical lens device 40 according to the invention shown in FIG. 5. From these characteristic curves, it is known that the optical lens device 40 according to the invention may indeed display excellent characteristics in optics and also fulfill the requirement of resolution and image quality needed by the image scanner.

However, the preferable embodiments described thereinbefore are applied for describing the invention in detail and are not to limit the ranges of the invention. Therefore, all those skilled in such arts should understand that any appropriate slight variation and adjustment that are still within the merits of the invention are within the spirits and fields of the invention.

In summary, the concretion of the invention has indeed fulfilled the merits, of invention patent, specified in the patent law so, please your esteemed members of reviewing committee review the present patent application in favorable way and grant it as a formal pattern as soon as possible.

What is claimed is:

1. An optical lens device of *an* image scanner [may receive the optical image reflected from a document and focuses the optical image into an image on an image induction element, and the optical lens device], comprising:

a diaphragm; and plural lenses[, which are] arranged linearly with the diaphragm and [the] *an image* induction element for defining an optical path between [the] *a* document and the image induction element, wherein, according to [the]

different positions between the [lens] *plural lenses* and the diaphragm, the plural lenses [may be] *are* divided into two groups[; i.e., the], *wherein a* front group [lens] *of lenses* is located between the diaphragm and the document, and [the] *wherein a* back group [lens] *of lenses* is located between the diaphragm and the image induction element;

wherein, among the plural lenses, [the one that] *a first lens* is most close to the document [is called the first lens], [while the other one that] i wherein a last lens is most close to the image induction element [is called the last lens], [and the] *wherein a* distance that is between the last lens and the image induction element is abbreviated as BFL, [and the] *wherein a* length[,] of the [induced] image[, provided by the image induction element] is called [the] *an* image height, [and the] *wherein a* distance between the document and the image induction element is abbreviated as TT, and [the] *wherein an* effective focus length of the optical lens device is abbreviated as EFL; *and,* wherein[, the] *a* ratio between [the] *a* diameter of the last lens of the optical lens device and [the] *a* diameter of the first lens is greater than one[;], that is, the diameter of the last lens/the diameter of the first lens>1.

2. The optical lens device [of image scanner] according to claim 1, wherein [its characteristic further includes: the] *a* ratio between *the* EFL and the image height is smaller than 0.9 (i.e., EFL/image height<0.9).

3. The optical lens device [of image scanner] according to claim 1, wherein [its characteristic further includes: the] *a* ratio between *the* BFL and *the* TT is smaller than 0.05 (i.e., BFL/TT<0.05).

4. The optical lens device [of image scanner] according to claim 1, wherein the plural lenses [includes] *include* four pieces of lens, and *wherein* the diaphragm is located between [the] *a* second *lens* and [the] *a* third lens *of the plural lenses*.

5. The optical lens device [of image scanner] according to claim 1, wherein the plural lenses [includes] *include* three pieces of lens, and *wherein* the diaphragm is located between the first *lens* and [the] *a* second lens *of the plural lenses*.

6. The optical lens device [of image scanner] according to claim 1, wherein the plural lenses [includes] *include* five pieces of lens, and *wherein* the diaphragm is located between [the] *a* second and [the] *a* third lens *of the plural lenses*.

7. The optical lens device [of image scanner] according to claim 1, wherein *the* BFL<10 mm.

8. The optical lens device [of image scanner] according to claim 1, wherein[, when] the image induction element [is] *comprises* a charge coupled device (abbreviated as CCD) that has 4 μm pixel pitch, 600 dpi resolution, and is capable of scanning *a* maximum document in A4 size, [then its] *and wherein the* TT value is smaller than 200 mm.

9. The optical lens device [of image scanner] according to claim 1, wherein[, when] the image induction element is a charge coupled device (abbreviated as CCD) that has 5.25 μm pixel pitch, 300 dpi resolution, and is capable of scanning *a* maximum document in A4 size, [then its] *and wherein the* TT value is smaller than 200 mm.

10. The optical lens device [of image scanner] according to claim 1, wherein[, when] the image induction element is a charge coupled device (abbreviated as CCD) that has 4 μm pixel pitch, 600 dpi resolution, and is capable of scanning *a* maximum document in A3 size, [then its] *and wherein the* TT value is smaller than 280 mm.

11. The optical lens device [of image scanner] according to claim 1, wherein[, when] the image induction element is a charge coupled device (abbreviate as CCD) that has 4 μm pixel pitch, 1200 dpi resolution, and is capable of scanning [the] *a* maximum document in A4 size [its], *wherein the* TT value is smaller than 280 mm, *wherein the* BFL<25 mm, and *wherein* BFL/TT<0.1.

12. The optical lens device [of image scanner] according to claim 1, wherein the plural lenses [includes] *include* four pieces of lens, and *wherein* the diaphragm is located in front of the plural lenses.

13. An image scanner [having optical lens device] comprising:

a scanning area, which [may be available for supporting] *supports* a document to be scanned;

a light source which [may emit] *emits* light to the scanning area for generating *an* optical image of the document;

a light-guiding device, which includes at least one piece of reflective mirror for [making] *reflecting* the optical image [proceed at least once reflection and guides the reflected optical image] toward a predetermined direction;

an optical lens device, which receives the optical image [transferred] *reflected* from the light-guiding device and focuses it into *an* image; *and* an image induction element[, which is just] located at [the] *a* position corresponding to [the place] where the optical image is focused into [an] *the* image;

wherein[,] the optical lens device [at least includes] *comprises*:

a diaphragm and plural lenses, [which] *wherein the plural lenses* are arranged linearly with the diaphragm and the image induction element for defining [an] *a fixed* optical path between the document and the image induction element wherein, among the plural lenses, [the one that] *a first lens* is most close to the document [is called the first lens], [while the other one that] *wherein a last lens* is most close to the image induction element [is called the last lens], [and the] *wherein a* distance that is between the last lens and the image induction element is abbreviated as BFL, [and the] *wherein a* length[,] of the [induced] image[, provided by the image induction element] is called [the] *an* image height, [and the] *wherein a* distance between the document and the image induction element is abbreviated as TT, and [the] *wherein an* effective focus length of the optical lens device is abbreviated as EFL; *and* wherein[, the] *a* ratio between [the] *a* diameter of the last lens of the optical lens device and [the] *a* diameter of the first lens is greater than one[; that is, the diameter of the last lens/the diameter of the first lens>1], *and wherein BFL/TT<0.05*.

14. The image scanner [having optical lens device] according to claim 13 wherein [its characteristic further includes: the] *a* ratio between *the* EFL and the image height is smaller than 0.9 (i.e., EFL/image height<0.9).

15. The image scanner [having optical lens device] according to claim 13, wherein the plural lenses *include* at least [includes] four pieces of lens, and[,] *wherein* the diaphragm is located between [the] *a* second *lens* and [the] *a* third lens *of the plural lenses*.

16. The image scanner [having optical lens device] according to claim 13, wherein the plural lenses *include* at least [includes] three pieces of lens, and[,] *wherein* the diaphragm is located between the first *lens* and [the] *a* second lens *of the plural lenses*.

17. The image scanner [having optical lens device] according to claim 13, wherein BFL/TT[<] *is between 0.026 and* 0.05.

18. The image scanner [having optical lens device] according to claim 13, wherein BFL<10 mm.

19. The image scanner [having optical lens device] according to claim 13, wherein[, when] the image induction element is a charge coupled device (abbreviated as CCD) that has 4 μm pixel pitch, 600 dpi resolution, and is capable of scanning *a* maximum document in A4 size, [then its] *and wherein the* TT value is smaller than 200 mm.

20. The image scanner [having optical lens device] according to claim 13, wherein[, when] the image induction element is a charge coupled device (abbreviated as CCD) that has 5.25 μm pixel pitch, 300 dpi resolution, and is capable of scanning *a* maximum document in A4 size, [then its] *and wherein the* TT value is smaller than 200 mm.

21. The image scanner [having optical lens device] according to claim 13, wherein[, when] the image induction element is a charge coupled device (abbreviated as CCD) that has 4 μm pixel pitch, 600 dpi resolution, and is capable of scanning *a* maximum document in A3 size, [then its] *and wherein the* TT value is smaller than 280 mm.

22. The image scanner [having optical lens device] according to claim 13, wherein[, when] the image induction element is a charge coupled device (abbreviate as CCD) that has 4 μm pixel pitch, 1200 dpi resolution, and is capable of scanning [the] *a* maximum document in A4 size, [its] *wherein the* TT value is smaller than 280 mm, *wherein the* BFL<25 mm, and *wherein* BFL/TT<0.1.

23. The image scanner [having optical lens device] according to claim 13, wherein the plural lenses [includes] *include* five pieces of lens, and *wherein* the diaphragm is located between [the] *a* second *lens* and [the] *a* third lens *of the plural lenses*.

24. The image scanner [having optical lens device] according to claim 13, wherein the plural lenses [includes] *include* four pieces of lens, and *wherein* the diaphragm is located in front of the plural lenses.

*25. An apparatus, comprising:*

*a diaphragm; and*

*two or more lenses arranged linearly with an image induction element and the diaphragm, wherein the two or more lenses define an optical path between a document and the image induction element, wherein the two or more lenses include a first lens and a last lens, wherein the first lens is located closest to the document of all the two or more lenses along the optical path, wherein the last lens is located closest to the image induction element of all the two or more lenses along the optical path, wherein the first lens is located on an opposite side of the diaphragm as the last lens, and wherein a distance between the last lens and the image induction element is between 10 mm and 4.84 mm.*

*26. The apparatus according to claim 25, wherein a distance between the document and the image induction element is between 200 mm and 183 mm.*

*27. The apparatus according to claim 25, wherein a ratio between an effective focus length of the apparatus and an image height is between 0.9 and 0.676.*

*28. The apparatus according to claim 25, wherein a ratio comprising a distance between the last lens and the image induction element and a distance between the document and the image induction element is between 0.05 and 0.026.*

*29. The apparatus according to claim 25, wherein the two or more lenses comprise four pieces of lens, and wherein the diaphragm is located between a second lens and a third lens.*

*30. The apparatus according to claim 25, wherein the two or more lenses comprise three pieces of lens, and wherein the diaphragm is located between the first lens and a second lens.*

*31. The apparatus according to claim 25, wherein the two or more lenses comprise five pieces of lens, and wherein the diaphragm is located between a second lens and a third lens.*

*32. The apparatus according to claim 25, wherein the two or more lenses comprise four pieces of lens, and wherein the diaphragm is located between the document and the first lens.*

*33. The apparatus according to claim 25, wherein a distance between the document and the image induction element is between 200 mm and 183 mm, and wherein a ratio of the distance between the last lens and the image induction element and the distance between the document and the image induction element is between 0.05 and 0.026.*

*34. A system, comprising:*

*a diaphragm;*

*a light source configured to emit light onto a document;*

*an image induction element configured to convert an optical image of the document into electronic signals; and*

*two or more lenses arranged linearly with the image induction element, wherein the two or more lenses define an optical path between the document and the image induction element, wherein the two or more lenses include a first lens and a last lens, wherein the first lens is located closest to the document of all the two or more lenses along the optical path, wherein the last lens is located closest to the image induction element of all the two or more lenses along the optical path, wherein the first lens is located on an opposite side of the diaphragm as the last lens, and wherein a distance between the document and the image induction element is less than 200 mm.*

*35. The system according to claim 34, wherein a distance between the last lens and the image induction element is less than 10 mm.*

*36. The system according to claim 35, wherein a ratio comprising the distance between the last lens and the image induction element and the distance between the document and the image induction element is less than 0.05.*

*37. The system according to claim 35, wherein a ratio between an effective focus length of the apparatus and an image height is less than 0.9.*

*38. The system according to claim 34, wherein a distance between the last lens and the image induction element is less than 10 mm, and wherein a ratio of the distance between the last lens and the image induction element and the distance between the document and the image induction element is less than 0.05.*

*39. An apparatus, comprising:*

*means for receiving an optical image of a document, wherein the means for receiving includes two or more lenses arranged linearly with both a means for converting the optical image into electronic signals and a diaphragm, and wherein the means for receiving and the means for converting define an optical path between the document and the means for converting;*

*wherein the two or more lenses include a first lens and a last lens, wherein the first lens is located closest to the document of all the two or more lenses along the optical path, wherein the last lens is located closest to the means for converting of all the two or more lenses along the optical path, and wherein the first lens is located on an opposite side of the diaphragm as the last lens; and*

*means for focusing the optical image on the means for converting, wherein the means for focusing includes the last lens of the two or more lenses, and wherein a dis-*

*tance between the document and the means for converting is less than 200 mm.*

*40. The apparatus according to claim 39, wherein a distance between the last lens and the means for converting is less than 10 mm.*

*41. The apparatus according to claim 40, wherein a ratio of the distance between the last lens and the means for converting and the distance between the document and the means for converting is less than 0.05.*

*42. An apparatus, comprising:*

*a diaphragm; and*

*two or more lenses arranged linearly with an image induction element and the diaphragm, wherein the two or more lenses define an optical path between a document and the image induction element, wherein the two or more lenses include a first lens and a last lens, wherein the first lens is located closest to the document of all the two or more lenses along the optical path, wherein the last lens is located closest to the image induction element of all the two or more lenses along the optical path, wherein the first lens is located on an opposite side of the diaphragm as the last lens, and wherein a ratio of a distance between the last lens and the image induction element and a distance between the document and the image induction element is less than 0.05.*

*43. The apparatus according to claim 42, wherein the distance between the last lens and the image induction element is less than 10 mm.*

*44. The method according to claim 42, wherein the distance between the document and the image induction element is less than 200 mm.*

* * * * *

UNITED STATES PATENT AND TRADEMARK OFFICE

CERTIFICATE OF CORRECTION

PATENT NO. : RE41,794 E
APPLICATION NO. : 11/499821
DATED : October 5, 2010
INVENTOR(S) : Huang et al.

It is certified that error appears in the above-identified patent and that said Letters Patent is hereby corrected as shown below:

Column 11, line 10, in Claim 1, delete "that] i wherein a last lens" and insert -- that], *wherein a last lens* --.

Column 11, line 20, in Claim 1, delete "*and*," and insert -- *and* --.

Column 12, line 52, in Claim 14, delete "claim 13" and insert -- claim 13, --.

Column 14, line 40, in Claim 37, delete "*claim 35*," and insert -- *claim 34*, --.

Column 16, line 13, in Claim 44, delete "*method*" and insert -- *apparatus* --.

Signed and Sealed this
Twenty-eighth Day of August, 2012

David J. Kappos

David J. Kappos
*Director of the United States Patent and Trademark Office*